US012608292B2

(12) United States Patent
Yu et al.

(10) Patent No.: US 12,608,292 B2
(45) Date of Patent: Apr. 21, 2026

(54) MULTI-MODULE COMMUNICATION MANAGEMENT METHOD IN ATE TEST SYSTEM AND ATE TEST SYSTEM

(71) Applicant: BEIJING HUAFENG TEST & CONTROL TECHNOLOGY CO., LTD., Beijing (CN)

(72) Inventors: Leiting Yu, Beijing (CN); Ning Ju, Beijing (CN)

(73) Assignee: Beijing Huafeng Test & Control Technology Co., LTD., Beijing (CN)

( * ) Notice: Subject to any disclaimer, the term of this patent is extended or adjusted under 35 U.S.C. 154(b) by 0 days.

(21) Appl. No.: 18/850,469

(22) PCT Filed: Apr. 23, 2024

(86) PCT No.: PCT/CN2024/089277
§ 371 (c)(1),
(2) Date: Sep. 24, 2024

(87) PCT Pub. No.: WO2025/129880
PCT Pub. Date: Jun. 26, 2025

(65) Prior Publication Data
US 2026/0003754 A1      Jan. 1, 2026

(30) Foreign Application Priority Data
Dec. 18, 2023    (CN) .......................... 202311734692.8

(51) Int. Cl.
*G06F 11/00*          (2006.01)
*G06F 11/273*        (2006.01)
(52) U.S. Cl.
CPC ................................. *G06F 11/2733* (2013.01)
(58) Field of Classification Search
CPC ... G06F 11/2733; G06F 11/277; G06F 11/263
See application file for complete search history.

(56) References Cited

U.S. PATENT DOCUMENTS 9,170,922 B1    10/2015  Lachwani et al.
10,108,514 B1 *  10/2018  Kinderman ........... G06F 11/263
(Continued)

FOREIGN PATENT DOCUMENTS

BR          PI0614928 A2      4/2011
CN          101243445 A        8/2008
(Continued)

OTHER PUBLICATIONS

International Search Report and Written Opinion for corresponding PCT/CN2024/089277 mailed on Jun. 21, 2024.
(Continued)

*Primary Examiner* — Katherine Lin
(74) *Attorney, Agent, or Firm* — Sandberg Phoenix & von Gontard, PC

(57) ABSTRACT

A method is performed by a session management module and includes the steps described below. An update instruction sent by a target test module is received; a session table is queried according to identifier information corresponding to the target test module so that a listening module identifier set corresponding to the target test module is obtained; a demand instruction is sent to a listening module corresponding to each listening module identifier in the listening module identifier set; an acquisition instruction sent by the listening module is received and the acquisition instruction is sent to the target test module so that the target test module sends shared information to the session management module; the shared information corresponding to the shared information identifier sent by the target test module is received, and the shared information corresponding to the shared information identifier is sent to the listening module.

11 Claims, 6 Drawing Sheets

(56)　References Cited

U.S. PATENT DOCUMENTS

| 2007/0050392 | A1 | 3/2007 | Shukla et al. |
| 2009/0300419 | A1 | 12/2009 | Silverman et al. |
| 2011/0231437 | A1 | 9/2011 | Silverman et al. |
| 2014/0013158 | A1 | 1/2014 | Silverman et al. |
| 2014/0089485 | A1 | 3/2014 | Boberg et al. |
| 2014/0132571 | A1 | 5/2014 | Zeng et al. |
| 2018/0205621 | A1 | 7/2018 | Ungar et al. |
| 2020/0033409 | A1 | 1/2020 | Hobbs et al. |
| 2020/0259730 | A1 | 8/2020 | Ungar et al. |

FOREIGN PATENT DOCUMENTS

| CN | 103501258 | A | 1/2014 |
| CN | 103810089 | A | 5/2014 |
| CN | 106156277 | A | 11/2016 |
| CN | 110297766 | A | 10/2019 |
| CN | 111190754 | A | 5/2020 |
| CN | 111782547 | A | 10/2020 |
| CN | 112256579 | A | 1/2021 |
| CN | 112685298 | A | 4/2021 |
| CN | 112749023 | A | 5/2021 |
| CN | 114647544 | A | 6/2022 |
| CN | 115391230 | A | 11/2022 |
| CN | 115421028 | A | 12/2022 |
| CN | 218213317 | U | 1/2023 |
| CN | 111190754 | B | 8/2023 |
| CN | 117424843 | A | 1/2024 |
| EP | 2692185 | A1 | 2/2014 |
| EP | 4597129 | A1 | 8/2025 |
| KR | 20080047346 | A | 5/2008 |
| MX | 2008002506 | A | 4/2008 |
| RU | 2008106952 | A | 8/2009 |
| TW | 201840996 | A | 11/2018 |
| TW | 202417871 | A | 5/2024 |
| WO | 2007024438 | A1 | 3/2007 |
| WO | 2012134361 | A1 | 10/2012 |
| WO | 2018132595 | A1 | 7/2018 |
| WO | 2019218458 | A1 | 11/2019 |
| WO | 2023104121 | A1 | 6/2023 |
| WO | 2024067735 | A1 | 4/2024 |

OTHER PUBLICATIONS

L. Qian, Distributed Software Testing Method Based on Apache ZooKeeper and ActiveMQ (2016) DOI:10.3969/j.issn.1007-1423. 2016.36.014.

Notification to Grant Patent Right for Invention in Priorty App. CN202311734692.8 issued Jan. 22, 2024.

Extended European Search report from corresponding EP App. No. 24772193.9 mailed Sep. 15, 2025.

Notice of Allowance from corresponding TW App. No. 113119716 mailed Sep. 25, 2025.

* cited by examiner

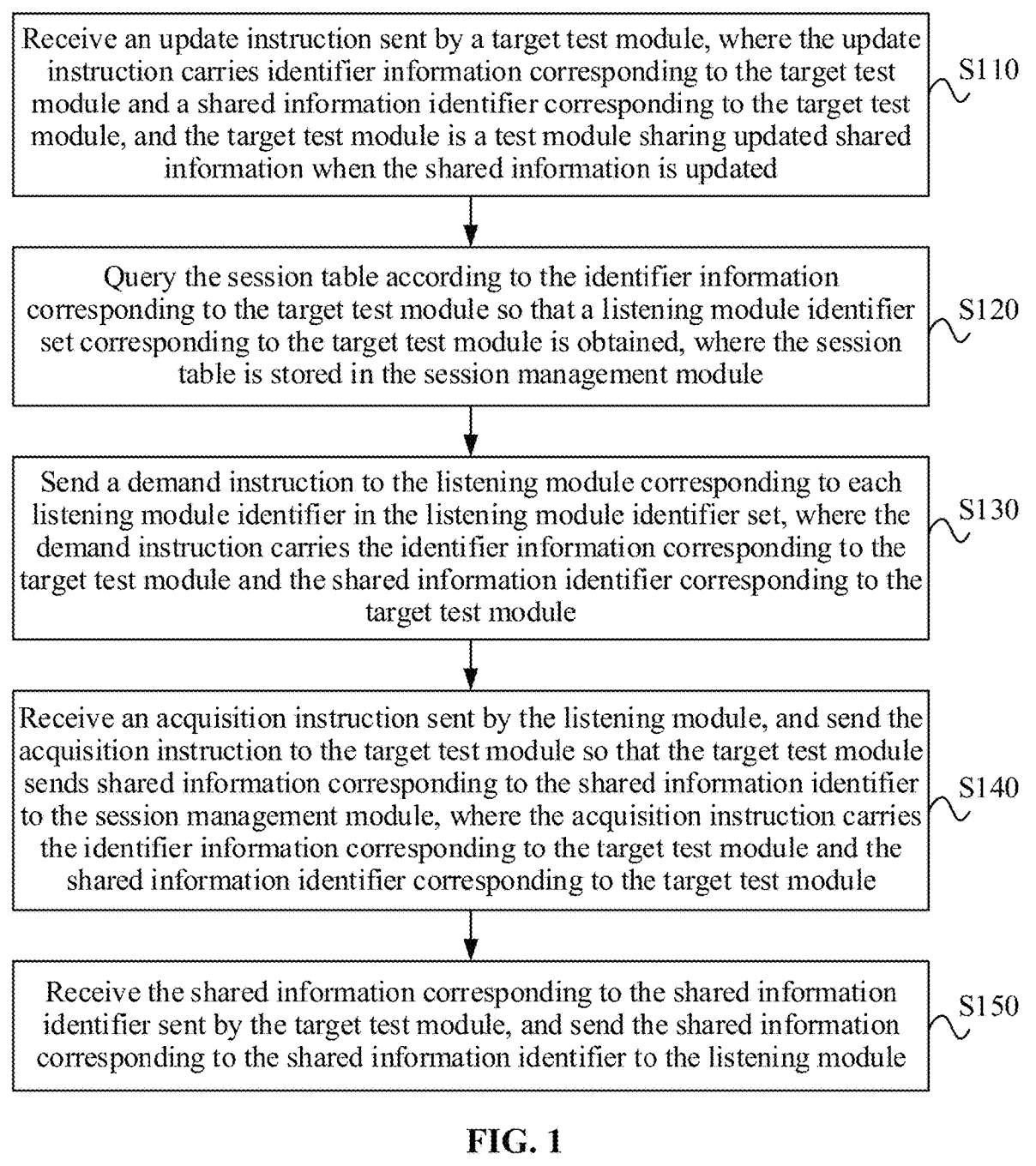

Receive an update instruction sent by a target test module, where the update instruction carries identifier information corresponding to the target test module and a shared information identifier corresponding to the target test module, and the target test module is a test module sharing updated shared information when the shared information is updated ⟿ S110

Query the session table according to the identifier information corresponding to the target test module so that a listening module identifier set corresponding to the target test module is obtained, where the session table is stored in the session management module ⟿ S120

Send a demand instruction to the listening module corresponding to each listening module identifier in the listening module identifier set, where the demand instruction carries the identifier information corresponding to the target test module and the shared information identifier corresponding to the target test module ⟿ S130

Receive an acquisition instruction sent by the listening module, and send the acquisition instruction to the target test module so that the target test module sends shared information corresponding to the shared information identifier to the session management module, where the acquisition instruction carries the identifier information corresponding to the target test module and the shared information identifier corresponding to the target test module ⟿ S140

Receive the shared information corresponding to the shared information identifier sent by the target test module, and send the shared information corresponding to the shared information identifier to the listening module ⟿ S150

FIG. 1

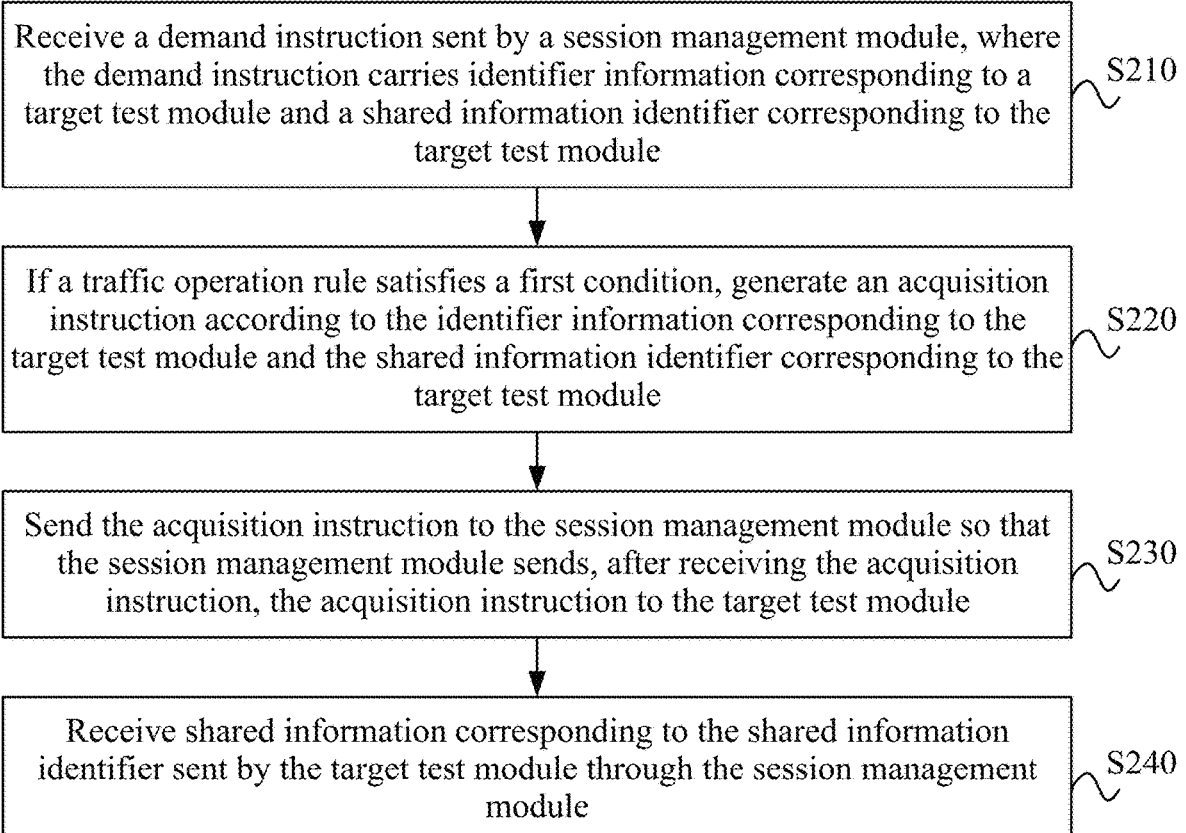

Receive a demand instruction sent by a session management module, where the demand instruction carries identifier information corresponding to a target test module and a shared information identifier corresponding to the target test module    S210

If a traffic operation rule satisfies a first condition, generate an acquisition instruction according to the identifier information corresponding to the target test module and the shared information identifier corresponding to the target test module    S220

Send the acquisition instruction to the session management module so that the session management module sends, after receiving the acquisition instruction, the acquisition instruction to the target test module    S230

Receive shared information corresponding to the shared information identifier sent by the target test module through the session management module    S240

Update instruction reception module

320

Listening module obtaining module

330

Demand instruction sending module

350

Shared information reception module

340

Acquisition instruction reception module

410

Demand instruction reception module

420

Acquisition instruction generation module

440

Shared information sending module

430

Acquisition instruction sending module

10

11 Main control module

12 ROM

13 RAM

14

15 I/O interface

16 Input unit

17 Output unit

18 Storage unit

19 Communication unit

MULTI-MODULE COMMUNICATION MANAGEMENT METHOD IN ATE TEST SYSTEM AND ATE TEST SYSTEM

CROSS-REFERENCE TO RELATED APPLICATIONS

This is a National Stage Application filed under 35 U.S.C. 371 based on International Patent Application No. PCT/CN2024/089277, filed on Apr. 23, 2024, which claims priority to Chinese Patent Application No. 202311734692.8 filed on Dec. 18, 2023, the disclosure of both said applications being incorporated herein by reference in their entirety.

TECHNICAL FIELD

Embodiments of the present application relate to the technical field of communications, for example, to a management method and apparatus and an automatic test equipment (ATE) test system.

BACKGROUND

Communication between test modules and listening modules is the basis for multi-module collaboration, such as testing performed by an automatic test equipment (ATE) tester. Conventional communication methods for multi-module collaboration include pipes, message queues, shared memory, remote procedure calls and sockets.

However, most of the preceding methods are only applicable to communication between a single test module and a single listening module. When the total number of test modules and listening modules is more than three, the communication complexity and the module running efficiency will be greatly affected.

SUMMARY

Embodiments of the present application provide a management method and apparatus and an automatic test equipment (ATE) test system, which can solve the problem that the existing communication methods fail to reduce the communication complexity and fail to improve the module running efficiency when the total number of test modules and listening modules is more than three, such as in the case of multiple test modules and multiple test modules.

According to an aspect of the present application, a management method is provided and performed by a session management module, and the session management module is separately connected to at least one test module and at least one listening module. The method includes the steps described below. An update instruction sent by a target test module is received, where the update instruction carries identifier information corresponding to the target test module and a shared information identifier corresponding to the target test module, and the target test module is a test module sharing updated shared information when the shared information is updated; a session table is queried according to the identifier information corresponding to the target test module so that a listening module identifier set corresponding to the target test module is obtained, where the session table is stored in the session management module; a demand instruction is sent to a listening module corresponding to each listening module identifier in the listening module identifier set, where the demand instruction carries the identifier information corresponding to the target test module and the shared information identifier corresponding to the target test module; an acquisition instruction sent by the listening module is received and the acquisition instruction is sent to the target test module so that the target test module sends shared information corresponding to the shared information identifier to the session management module, where the acquisition instruction carries the identifier information corresponding to the target test module and the shared information identifier corresponding to the target test module; and the shared information corresponding to the shared information identifier sent by the target test module is received, and the shared information corresponding to the shared information identifier is sent to the listening module.

According to an aspect of the present application, a management method is provided and performed by a listening module. The method includes the steps described below. A demand instruction sent by a session management module is received, where the demand instruction carries identifier information corresponding to a target test module and a shared information identifier corresponding to the target test module; in response to a traffic operation rule satisfying a first condition, an acquisition instruction is generated according to the identifier information corresponding to the target test module and the shared information identifier corresponding to the target test module; the acquisition instruction is sent to the session management module so that the session management module sends, after receiving the acquisition instruction, the acquisition instruction to the target test module; and shared information corresponding to the shared information identifier sent by the target test module through the session management module is received.

According to another aspect of the present application, a management apparatus is provided. The management apparatus includes an update instruction reception module, a listening module obtaining module, a demand instruction sending module, an acquisition instruction reception module and a shared information reception module. The update instruction reception module is configured to receive an update instruction sent by a target test module, where the update instruction carries identifier information corresponding to the target test module and a shared information identifier corresponding to the target test module, and the target test module is a test module sharing updated shared information when the shared information is updated; The listening module obtaining module is configured to query a session table according to the identifier information corresponding to the target test module to obtain a listening module identifier set corresponding to the target test module, where the session table is stored in the session management module; The demand instruction sending module is configured to send a demand instruction to a listening module corresponding to each listening module identifier in the listening module identifier set, where the demand instruction carries the identifier information corresponding to the target test module and the shared information identifier corresponding to the target test module; the acquisition instruction reception module is configured to receive an acquisition instruction sent by the listening module and send the acquisition instruction to the target test module so that the target test module sends shared information corresponding to the shared information identifier to the session management module, where the acquisition instruction carries the identifier information corresponding to the target test module and the shared information identifier corresponding to the target test module; and the shared information reception module is configured to receive the shared information corresponding to the shared information identifier sent by the target test module, and send the shared information corresponding to the shared information identifier to the listening module.

According to another aspect of the present application, a management apparatus is provided. The management apparatus includes a demand instruction reception module, an acquisition instruction generation module, an acquisition instruction sending module and a shared information sending module. The demand instruction reception module is configured to receive a demand instruction sent by a session management module, where the demand instruction carries identifier information corresponding to a target test module and a shared information identifier corresponding to the target test module; the acquisition instruction generation module is configured to, in response to a traffic operation rule satisfying a first condition, generate an acquisition instruction according to the identifier information corresponding to the target test module and the shared information identifier corresponding to the target test module; the acquisition instruction sending module is configured to send the acquisition instruction to the session management module so that the session management module sends, after receiving the acquisition instruction, the acquisition instruction to the target test module; and the shared information sending module is configured to receive shared information corresponding to the shared information identifier sent by the target test module through the session management module.

According to another aspect of the present application, an ATE test system is provided. The ATE test system includes at least one of an ATE tester and a tester auxiliary device, at least one of the tester and the tester auxiliary device runs at least one executable computer program to implement the management method according to any embodiment of the present application.

According to another aspect of the present application, a computer-readable storage medium is provided. The computer-readable storage medium stores computer instructions which, when executed by a processor, are configured to implement the management method according to any embodiment of the present application.

BRIEF DESCRIPTION OF DRAWINGS

FIG. 1 is a flowchart of a management method according to Embodiment One of the present application;

FIG. 3 is a flowchart of a management method according to Embodiment Two of the present application;

DETAILED DESCRIPTION

Figure 2:
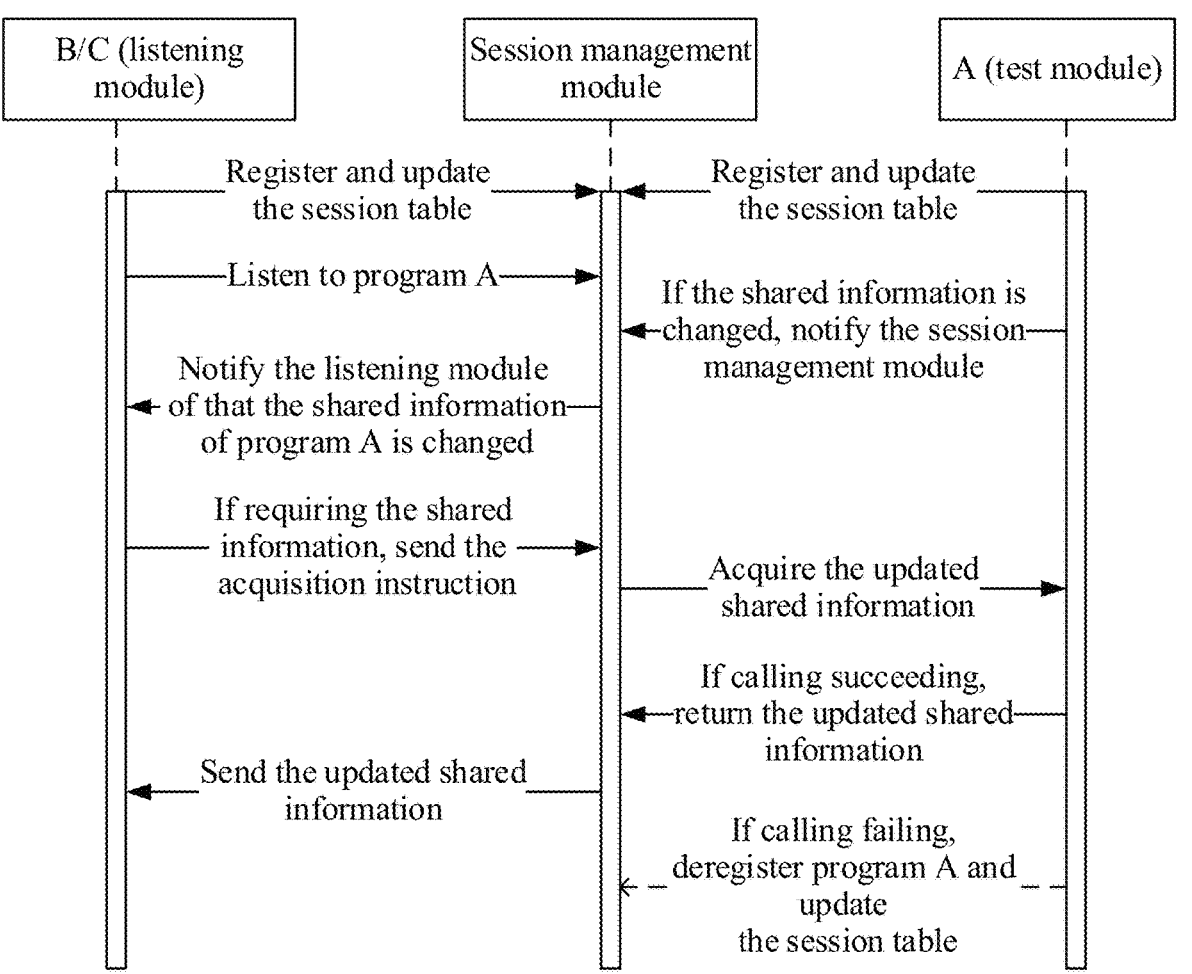
FIG. 2 is a schematic diagram of another management method according to Embodiment One of the present application.

Technical solutions in embodiments of the present application will be described in conjunction with drawings in the embodiments of the present application. Apparently, the embodiments described herein are part of embodiments of the present application. Based on the embodiments in the present application, all other embodiments obtained by those of ordinary skill in the art without creative work are within the protection scope of the present application.

It is to be noted that the terms "first", "second" and the like in the description, claims and drawings of the present application are used for distinguishing between similar objects and are not necessarily used for describing a particular order or sequence. It is to be understood that the data used in this manner is interchangeable in appropriate cases so that the embodiments of the present application described herein may also be implemented in an order not illustrated or described herein. Additionally, terms "including" and "having" as well as any variations thereof are intended to encompass a non-exclusive inclusion. For example, a process, method, system, product or device that includes a series of steps or units not only includes the expressly listed steps or units but may also include other steps or units that are not expressly listed or are inherent to such a process, method, product or device.

It is to be understood that the type, use range and use scenarios of personal information involved in the present disclosure should be notified to and authorized by a user appropriately according to relevant laws and regulations before solutions of embodiments of the present disclosure are used.

Embodiment One

FIG. 1 is a flowchart of a management method according to embodiment one of the present application. The embodiment is applicable to the case of multi-module communication management, such as information sharing and progress collaboration in the multi-module communication process. The method may be performed by a management apparatus in embodiment three of the present application. The apparatus may be implemented by software and/or hardware. As shown in FIG. 1, the method is performed by a session management module, and the session management module is separately connected to at least one test module and at least one listening module. It is to be noted that the test module and the listening module may operate in the same device or in different devices respectively. The session management module may operate in the same device with any module or in an independent device individually. The management method includes the steps described below.

In S110, an update instruction sent by a target test module is received, where the update instruction carries identifier information corresponding to the target test module and a shared information identifier corresponding to the target test module, and the target test module is a test module sharing updated shared information when the shared information is updated.

The target test module is a test module sharing updated shared information when the shared information is updated. The test module may be a test program, including but not limited to at least one of a test program, a test item, a handler control program, a production monitoring program, a third-party data analysis program, a device maintenance and self-check program, a yield analysis program and a fault detection program in an automatic test equipment (ATE) tester. The update instruction is used for notifying the session management module of that the shared information in the target test module is changed.

When the shared information of the target test module is updated, the session management module receives the update instruction sent by the target test module. The update instruction carries the identifier information of the target test module and the shared information identifier corresponding to the target test module so that the session management module can quickly determine the target test module and the shared information of the target test module that is changed.

Optionally, before the update instruction sent by the target test module is received, a session table is acquired. The session table includes identifier information corresponding to at least one test module, state information corresponding to the at least one test module, attribute information corresponding to each test module identifier and a public function corresponding to each piece of shared information, where the attribute information includes at least one listening module identifier and at least one shared information identifier which correspond to each test module identifier.

The session table may be stored in the session management module. The attribute information corresponding to each test module identifier includes at least one listening module identifier and at least one shared information identifier which correspond to each test module identifier. The attribute information may further include whether to allow being listened to. It is to be noted that the listening module may listen to all shared information in the test module, or only listen to any piece of shared information in the test module. The session table may further include state information of the at least one test module, where the state information may include a registration state or a deregistration state. It is to be noted that the listening module and the test module may both be programs. When a program is used for testing, the program is a test module; when the program is used for listening to other programs, the program is a listening module. That is, the test module and the listening module are relative concepts. A program may be both a test module and simultaneously a listening module for listening to other programs. Multiple programs can collaborate with each other by calling a public function corresponding to each piece of shared information in the session table.

Optionally, the step in which the session table is acquired includes the step described below. A registration instruction sent by at least one test module or at least one listening module is received, and registration is performed, according to the registration instruction, in the session table based on registration information corresponding to the at least one test module or the at least one listening module so that the session table is updated, where the registration instruction of the at least one test module carries the registration information, and the registration information of a test module of the at least one test module includes identifier information, state information, attribute information and a public function corresponding to each piece of shared information, where the attribute information of the module includes at least one shared information identifier corresponding to the test module; the registration information of a listening module of the at least one listening module includes identifier information, state information and attribute information, where the attribute information of the listening module includes at least one shared information identifier of a test module to which the listening module wants to listen and corresponding to the listening module.

When at least one test module or at least one listening module is started, the at least one test module or the at least one listening module sends the registration instruction to the session management module, and the session management module performs registration in the session table based on the registration information (a unique identifier (ID)) corresponding to the test module or the registration information (a unique identifier (ID)) corresponding to the listening module, and the session table is updated based on the registration information during registration. It is to be noted that the registration information of the listening module may not include a public function corresponding to each piece of shared information, that is, the public function corresponding to each piece of shared information in the registration information of the listening module may be null. The listening module may selectively listen to shared information in the test module or may listen to all shared information in the test module.

The registration instruction sent by the at least one test module or the at least one listening module is received, registration is performed, according to the registration instruction, in the session table based on the registration information corresponding to the test module or the registration information corresponding to the listening module so that the session table is updated, so a more convenient access mechanism can be provided for the newly added test module or listening module. Moreover, shared information may be set according to the registration information corresponding to the test module, and at least one piece of shared information in the test module that the listening module wants to listen to is set according to the registration information corresponding to the listening module, so in the subsequent listening process, if the shared information that the listening module wants to listen to is updated, the function of updating the session table in sections can be achieved.

Optionally, the step in which the session table is acquired includes the step described below. An information modification instruction sent by at least one test module or at least one listening module is received, modification is performed in the session table based on modification information corresponding to at least one test module or at least one listening module, and the session table is updated according to the information modification instruction, where the information modification instruction carries the modification information, and the modification information includes at least one of state information, attribute information and a public function.

If registration information of at least one test module or at least one listening module needs to be changed during operation, for example, a new test module or a new listening module is registered in the session table and thus registration information needs to be changed, an information modification instruction is sent to the session management module, where the information modification instruction carries modification information, and the modification information includes at least one of state information, attribute information and a public function. After receiving the information modification instruction, the session management module updates the session table according to the modification information carried by the information modification instruction. For example, as shown in Table 1, Table 1 is the updated session table after the session management module receives the information modification instruction of program A. It can be seen from Table 1 that program A is both a test module and a listening module, program B is a listening module, and program C is a test module. Since the program C is not registered and does not exist in the original session table, program A cannot listen to program C. After program C accesses the session management module, the session table is updated according to the registration information of program C; program A needs to listen to shared information of sharing 3 and sharing 4 in program C after program C is registered, then program A sends an information modification instruction to the session management module, and attribute information of program A in the session table is updated according to the information modification instruction, that is, sharing 3 and sharing 4 of program C are added to the session table. Through the preceding optional embodiment, the listening module or the test module can actively modify the registration information in the session table.

TABLE 1

| Program | State | Attribute | Public function |
|---------|-------|-----------|-----------------|
| Program A | Registered | Sharing 1 and sharing 2; listen to sharing 3 and sharing 4 of program C | getInfo1 and getInfo2 |
| Program B | Registered | Listen to sharing 2 of program A | / |
| Program C | Registered | Sharing 3, sharing 4 and sharing 5 | getInfo3, getInfo4 and getInfo5 |

In S120, the session table is queried according to the identifier information corresponding to the target test module so that a listening module identifier set corresponding to the target test module is obtained, where the session table is stored in the session management module.

The session table is stored in the session management module, and the listening module identifier set includes at least one listening module identifier.

The session management module queries the session table according to the identifier information corresponding to the target test module in the update instruction, and obtains a listening module identifier set for listening to the target test module; or the session management module queries the session table according to the identifier information and the shared information identifier in the update instruction which corresponds to the target test module, and obtains a listening module identifier set for listening to shared information corresponding to the shared information identifier of the target test module, and a listening module corresponding to each listening module identifier in the listening module identifier set listens to the updated shared information in the target test module. It is to be noted that state information, in the session table, of the listening module corresponding to each listening module identifier in the listening module identifier set should be a registration state.

In S130, a demand instruction is sent to the listening module corresponding to each listening module identifier in the listening module identifier set, where the demand instruction carries the identifier information corresponding to the target test module and the shared information identifier corresponding to the target test module.

The session management module calls a public function corresponding to the shared information to send the demand instruction to the listening module corresponding to each listening module identifier in the listening module identifier set. The demand instruction is used for notifying the listening module of that the shared information of the target test module that the listening module listens to is changed.

In S140, an acquisition instruction sent by the listening module is received, and the acquisition instruction is sent to the target test module so that the target test module sends shared information corresponding to the shared information identifier to the session management module, where the acquisition instruction carries the identifier information corresponding to the target test module and the shared information identifier corresponding to the target test module.

The session management module receives the acquisition instruction sent by the listening module. The acquisition instruction is used for notifying the session management module of that the session management module needs to acquire the updated shared information in the target test module. The session management module sends the acquisition instruction to the target test module, and the target test module, after receiving the acquisition instruction, calls the public function corresponding to the shared information to return the updated shared information corresponding to the shared information identifier to the session management module. It is to be noted that there may be multiple listening modules that send the acquisition instruction to the session management module. When the acquisition instruction is sent, the acquisition instruction may carry identifier information of the listening module simultaneously so that the session management module can send the updated shared information corresponding to the shared information identifier of the target test module to the corresponding listening module.

In S150, the shared information corresponding to the shared information identifier sent by the target test module is received, and the shared information corresponding to the shared information identifier is sent to the listening module.

After receiving the updated shared information corresponding to the shared information identifier sent by the target test module, the session management module calls the public function corresponding to the shared information to send the updated shared information corresponding to the shared information identifier to the listening module.

The acquisition instruction is forwarded by the session management module, and the updated shared information is forwarded to the listening module, that is, the session management module does not store the updated shared information, so the lightweight effect can be better achieved.

In an example, FIG. 2 is a schematic diagram of another management method according to embodiment one of the present application. As shown in FIG. 2, if the test module is program A, and listening modules are program B and program C, when program A, program B or program C is started, a new session needs to be established, and program A, program B and program C are registered in the session table of the session management module based on corresponding identifier information so that the session table is updated and maintained, where the session table includes attribution information of all programs and state information of all programs. When the new session is established, state information of program A, state information of program B and state information of program C are registration states. Program B and program C both listen to program A. When the shared information of program A is changed, program A sends the update instruction to the session management module to notify the session management module of that the shared information of program A is changed; after receiving the update instruction, the session management module queries listening modules that listen to program A in the session table and notifies the listening modules that listen to program A, that is, the session management module calls the public function corresponding to the shared information to send the demand instruction to program B and program C to notify program B and program C of that the shared information of program A that program B and program C listen to is changed; after receiving the demand instruction, program B and program C determines whether program B and program C need to acquire the updated shared information of program A, if program B and program C need to acquire the updated shared information of program A, program B and program C call the public function corresponding to the shared information to send the acquisition instruction to the session management module, and the session management module acquires the updated shared information from program A through the acquisition instruction; if calling is successful, the session management module acquires the updated shared information and sends the updated shared information to the listening modules.

It is to be noted that if program B and program C both need the updated shared information, program B and program C both need to call the public function corresponding to the shared information, that is, call the public function corresponding to the shared information twice through the session management module. The session management module actually acts as a proxy, and actually a public function interface is called by the session management module. The updated shared information is sent to the session management module twice, but the session management module does not retain and cache the updated shared information, and all shared information only needs to be maintained internally in the test module.

Optionally, the step described below is further included. If the acquisition instruction sent by the listening module is not received, state information corresponding to the listening module in the session table is updated according to identifier information corresponding to the listening module; and/or if successful-calling information of the listening module is not received within a predefined time, at least one of state information corresponding to the target test module in the session table, a shared information identifier corresponding to the public function corresponding to the target test module in attribute information in the session table and the public function is updated according to the public function, where the successful-calling information indicates that the listening module successfully establishes a connection with the target test module by calling the corresponding public function through the session management module; and/or if the shared information corresponding to the shared information identifier sent by the target test module is not received within a predefined time, state information corresponding to the target test module in the session table is updated according to the identifier information corresponding to the target test module.

The predefined time may be set according to actual needs.

In the first case, if the session management module does not receive the acquisition instruction sent by the listening module after sending the demand instruction to the listening module, it is determined that an error (abnormal exiting) occurs in the listening module, and the session management module cannot be connected to the listening module. Then, the state information corresponding to the listening module in the session table is updated according to the identifier information corresponding to the listening module, that is, the registration state of the listening module is updated to a deregistration state.

In the second case, after the session management module receives the acquisition instruction from the listening module and sends the acquisition instruction to the target test module, that is, after the listening module calls the public function corresponding to the shared information identifier through the session management module to establish connection with the target test module, if the session management module does not receive the successful-calling information fed back by the listening module within the predefined time, the session management module updates the state information corresponding to the target test module according to the public function corresponding to the target test module. For example, the state information of the target test module is updated from the registration state to the deregistration state; or the shared information identifier in the attribute information of the target test module is updated, where the shared information identifier corresponds to the preceding public function calling of which fails, for example, the shared information identifier is deleted; or the preceding public function is updated, for example, the corresponding public function is deleted or corrected. As shown in Table 1, if program B serving as the listening module wants to listen to shared information 2 of program A which may serve as the test module, program B will establish connection with program A by calling public function getInfo2 corresponding to shared information 2 through the session management module. If the session management module does not receive the successful-calling information fed back by program B within the predefined time, program A does not establish connection with program B through the session management module. Then, the session management module updates public function getInfo2 corresponding to program A in the session table, that is, deletes public function getInfo2, or deletes shared information 2 in the attribute information of program A, or modifies the state information of program A to the deregistration state, or performs the preceding update operations simultaneously.

In the third case, if the session management module does not receive the updated shared information corresponding to the shared information identifier sent by the target test module within the predefined time after sending the acquisition instruction to the target test module, it is determined that an error (abnormal exiting) occurs in the target test module. Then, the state information corresponding to the target test module in the session table is updated according to the identifier information corresponding to the target test module, and the registration state of the target test module is updated to the deregistration state, so the session table is updated; simultaneously, the listening module may be notified of that the target test module is deregistered. As shown in FIG. 2, if the session management module does not acquire the updated shared information of program A within the predefined time, it is indicated that the communication fails, and then the session management module deregisters program A in the session table, that is, changes the state information of program A to the deregistration state.

If the acquisition instruction sent by the listening module is not received, the state information corresponding to the listening module in the session table is updated according to identifier information corresponding to the listening module, and/or if the successful-calling information of the listening module is not received within the predefined time, at least one of the state information corresponding to the target test module in the session table, the shared information identifier corresponding to the public function corresponding to the target test module in the attribute information in the session table and the public function is updated according to the public function; and/or if the shared information corresponding to the shared information identifier sent by the target test module is not received within the predefined time, the state information corresponding to the target test module in the session table is updated according to the identifier information corresponding to the target test module. In this manner, the session table in the session management module can be quickly updated according to states of multiple modules, and redundant sessions can be discovered and processed in time while other modules are not affected.

According to the technical solutions of the embodiment, an update instruction sent by a target test module is received, where the update instruction carries identifier information corresponding to the target test module and a shared information identifier corresponding to the target test module, and the target test module is a test module sharing updated shared information when the shared information is updated; a session table is queried according to the identifier information corresponding to the target test module so that a listening module identifier set corresponding to the target test module is obtained; a demand instruction is sent to a listening module corresponding to each listening module identifier in the listening module identifier set, where the demand instruction carries the identifier information corresponding to the target test module and the shared information identifier corresponding to the target test module; an acquisition instruction sent by the listening module is received, and the acquisition instruction is sent to the target test module so that the target test module sends shared information corresponding to the shared information identifier to the session management module, where the acquisition instruction carries the identifier information corresponding to the target test module and the shared information identifier corresponding to the target test module; the shared information corresponding to the shared information identifier sent by the target test module is received, and the shared information corresponding to the shared information identifier is sent to the listening module. In this manner, when the shared information of the test module is changed, the session management module can be notified, then the session management module notifies the listening module that listens to the test module, and thus the listening module can acquire the updated shared information of the test module through the session management module, which can solve the problem that the existing communication methods fail to reduce the communication complexity and fail to improve the module running efficiency when the total number of test modules and listening modules is more than three are managed, such as in the case of multiple test modules and multiple test modules, thus effective management of multiple modules is achieved, and synchronous listening and updating is achieved. Compared with conventional communication methods, this method has lower complexity. Moreover, the session management module is only responsible for forwarding the updated shared information of the test module and does not have the data storage function, that is, the session management module adopts a distributed storage mode, so fast forwarding of the shared information can be achieved, the running efficiency of modules can be improved, and thus the work coordination between multiple test modules and multiple listening modules can be improved.

Embodiment Two

FIG. 3 is a flowchart of a management method according to embodiment two of the present application. The embodiment is applicable to the case of multi-module communication management, such as information sharing and progress collaboration in the multi-module communication process. The method may be performed by a management apparatus in embodiment four of the present application. The apparatus may be implemented by software and/or hardware. As shown in FIG. 3, the method is performed by a listening module and includes the steps described below.

In S210, a demand instruction sent by a session management module is received, where the demand instruction carries identifier information corresponding to a target test module and a shared information identifier corresponding to the target test module.

The listening module receives the demand instruction sent by the session management module and specifies that shared information in the target test module that is listened to by the listening module is changed.

In S220, if a traffic operation rule satisfies a first condition, an acquisition instruction is generated according to the identifier information corresponding to the target test module and the shared information identifier corresponding to the target test module.

The first condition may be set according to the traffic operation rule (the business logic situation) of the listening module. The traffic operation rule refers to the traffic logic situation included in a test sequence of a predefined range (a predefined range before a current test sequence or a predefined range after the current test sequence) of the current test sequence of the current listening module. For example, the first condition may be a feedback flag included in the test sequence within the predefined range of the current test sequence of the listening module, and a waited result corresponding to the feedback flag is generated by a test sequence of the target test module.

After receiving the demand instruction, each listening module determines whether the traffic operation rule of each listening module satisfies the first condition. If the traffic operation rule satisfies the first condition, it is indicated that the current listening module needs the updated shared information of the target test module; and then the acquisition instruction is generated according to the identifier information corresponding to the target test module and the shared information identifier corresponding to the target test module. It is to be noted that the acquisition instruction may carry identifier information of the current listening module.

In S230, the acquisition instruction is sent to the session management module so that the session management module sends, after receiving the acquisition instruction, the acquisition instruction to the target test module.

The listening module that needs the updated shared information of the target test module calls a public function corresponding to the shared information to send the acquisition instruction to the session management module. After receiving the acquisition instruction, the session management module forwards the acquisition instruction to the target test module.

In S240, shared information corresponding to the shared identifier sent by the target test module through the session management module is received.

After receiving the acquisition instruction, the target test module sends the updated shared information corresponding to the shared information identifier to the session management module. After receiving the updated shared information, the session management module calls the public function corresponding to the shared information to send the updated shared information to the listening module that needs the updated shared information of the target test module, and the listening module that needs the updated shared information of the target test module receives the updated shared information corresponding to the shared information identifier.

Optionally, if the traffic operation rule satisfies the first condition, the step in which the acquisition instruction is generated according to the identifier information corresponding to the target test module and the shared information identifier corresponding to the target test module includes the steps described below. If the test sequence within the predefined range of the current test sequence corresponding to the listening module includes the feedback flag, a first target test sequence corresponding to a target waited result corresponding to the feedback flag is acquired; if the first target test sequence is the test sequence of the target test module, it is determined that the traffic operation rule of the listening module satisfies the first condition; and the acquisition instruction is generated according to the identifier information corresponding to the target test module and the shared information identifier corresponding to the target test module.

The predefined range may be a predefined range before the current test sequence or a predefined range after the current test sequence, and the predefined range of the current test sequence may be set according to actual needs. The feedback flag is used for indicating that the listening module waits for updated test data or an updated test result, of a test sequence of the test module which is listened to. The target waited result is waited test data or a waited test result corresponding to the feedback flag. The first target test sequence is a test sequence that generates the waited test data or the waited test result.

If the test sequence within the predefined range of the current test sequence corresponding to the listening module includes the feedback flag, and the target test sequence corresponding to the target waited result corresponding to the feedback flag is the test sequence of the target test module, it is determined that the traffic operation rule of the listening module satisfies the first condition. The listening module needs to acquire the updated shared information of the target test module, and the listening module generates the acquisition instruction according to the identifier information corresponding to the target test module and the shared information identifier corresponding to the target test module.

Figure 4:
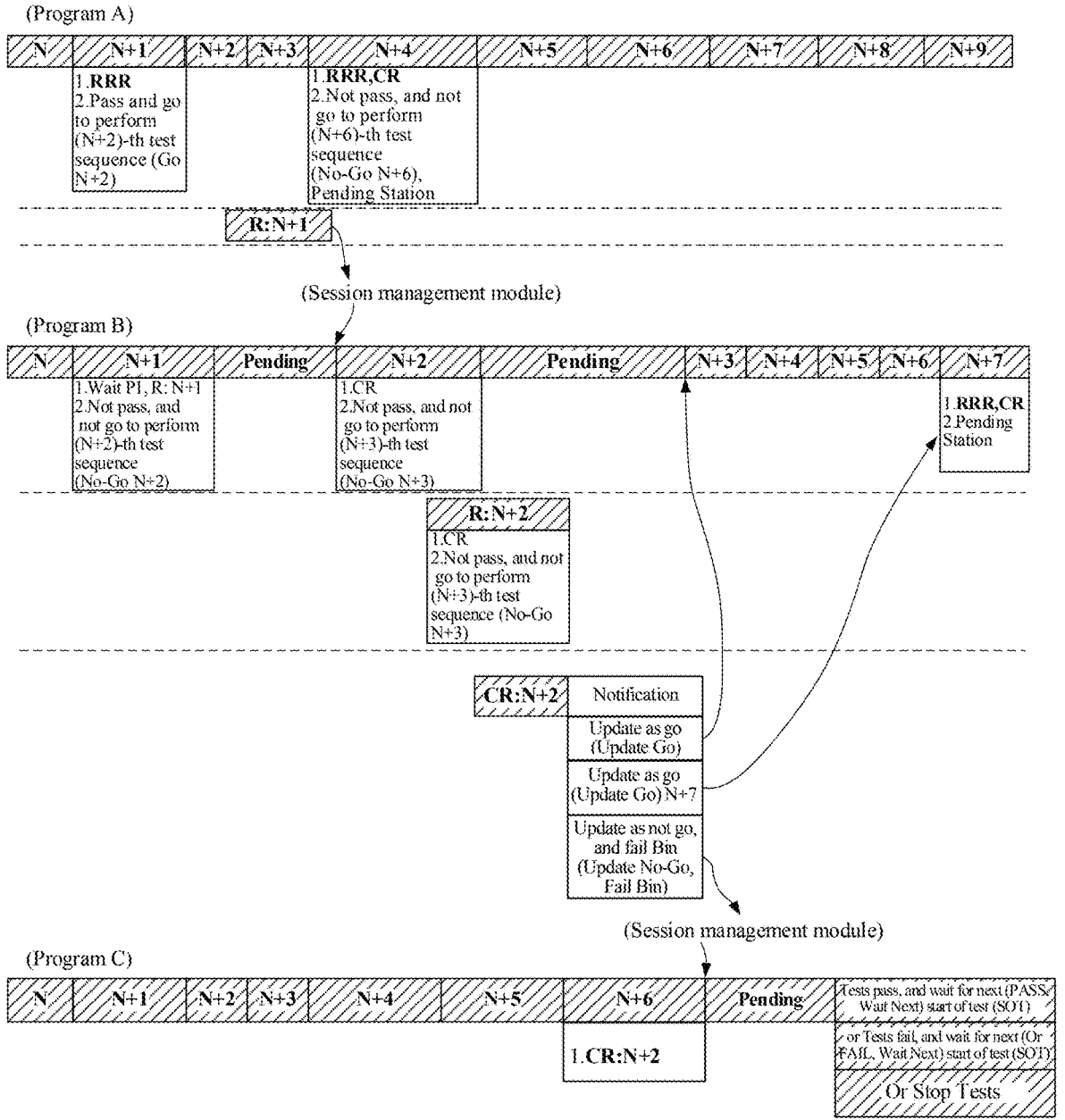
FIG. 4 is a schematic diagram of multi-program running according to Embodiment Two of the present application.

In an example, FIG. 4 is a schematic diagram of multi-program running according to embodiment two of the present application. As shown in FIG. 4, when multiple devices under test (DUTs) are tested in an automatic test equipment (ATE) tester, cross-program cooperation between multiple programs is required due to business relevance. If the target test module is program A, an association relationship exists between program A and program B, program B pre-registers in a session table in the session management module to listen to program A, and program B is a listening module. When the shared information of program A is changed, program B needs to be notified. Program A and program B include test sequences of multiple moments such as moment N and moment N+1. When program B runs the (N+1)-th test sequence, the predefined range includes feedback flag R: N+1, and a test result generated by the (N+1)-th test sequence of program A needs to be waited for, which indicates that program B needs the updated shared information of program A. In FIG. 4, when program A runs the (N+1)-th test sequence, the (N+1)-th test sequence includes feedback identifier information RRR, the test result of the (N+1)-th test sequence, that is, R: N+1, is included in the response of the device under test (DUT) after a period of time. Program A needs to send R: N+1 to the session management module firstly, which serves as a proxy and feeds back R: N+1 to program B. After the feedback of R: N+1 is listened by program B, program B stops waiting and continues to run the test sequence of moment N+2.

Optionally, if the traffic operation rule satisfies the first condition, the step in which the acquisition instruction is generated according to the identifier information corresponding to the target test module and the shared information identifier corresponding to the target test module includes the steps described below. If the test sequence within the predefined range of the current test sequence corresponding to the listening module includes a comparison flag, a second target test sequence corresponding to at least one piece of comparison information corresponding to the comparison flag is acquired; if the second target test sequence is the test sequence of the target test module, it is determined that the traffic operation rule of the listening module satisfies the first condition; and the acquisition instruction is generated according to the identifier information corresponding to the target test module and the shared information identifier corresponding to the target test module.

The comparison flag is used for indicating that a test result of the current test sequence is compared with comparison information of the target test sequence, where the comparison information is test data or a test result of the target test sequence. The second target test sequence is a test sequence generating the comparison information.

If the test sequence within the predefined range of the current test sequence corresponding to the listening module includes the comparison flag, and the at least one piece of comparison information corresponding to the comparison identifier is generated by the second target test sequence in the target test module, it is determined that the traffic operation rule of the listening module satisfies the first condition. The listening module needs the updated shared information of the target test module, and the listening module generates the acquisition instruction according to the identifier information corresponding to the target test module and the shared information identifier corresponding to the target test module.

In an example, as shown in FIG. 4, when the target test module is program B, the listening module is program C, the predefined range of the test sequence of N+6 in program C includes comparison flag CR: N+2, the at least one piece of comparison information corresponding to the comparison flag is the test result of the test sequence of N+2 of program B, and it is indicated that program C needs updated shared information of program B. In FIG. 4, when program B runs the (N+2)-th test sequence, where the (N+2)-th test sequence includes comparison identifier information CR and also includes No-Go N+3, and program B waits for the DUT to response the test result. When the test result is "Update No-Go, Fail Bin", that is, the comparison information is "Update No-Go, Fail Bin", program B first sends the comparison information to the session management module, the session management module forwards the comparison information to program C, and after acquiring the comparison information, program C stops running after waiting for a period of time.

Optionally, the shared information identifier includes at least one of an identifier of shared test ending information, an identifier of shared test resource occupation information, an identifier of shared handler control information, an identifier of shared test result data information, an identifier of shared test anomaly information, an identifier of shared test state information, an identifier of shared test time information, an identifier of shared device temperature information, an identifier of shared device environment information and an identifier of shared fault detection result information.

In an example, the technical solutions of the embodiment are applicable to the case where in the automatic mass production test in the ATE tester, multiple test modules and multiple listening modules need to jointly perform operations and data communication during the test process.

In an example, the test program needs to test each device under test and record results in the session table. If test program A needs to test device 1 under test, device 2 under test and device 3 under test simultaneously, when test program A is started, a new session is created and is registered based on corresponding identifier information in the session table of the session management module, and simultaneously, test item A1 of device 1 under test, test item A2 of device 2 under test and test item A3 of test device 3 under test are all registered in the session table of the session management module based on corresponding identifier information. Test program A listens to test item A1, test item A2 and test item A3. If the identifier of the shared information that is listened to by test program A is the identifier of shared test ending information, then when the test of test item A1 on device 1 under test is completed, that is, when the shared information corresponding to test item A1 is changed, test item A1 notifies the session management module, and the session management module broadcasts information to all programs that listen to test item A1. In this example, test program A is notified that if it is determined from the traffic operation rule of test program A that program A needs to call the public function of the shared information in the session management module to acquire the updated shared information, test program A is the listening module, test item A1 is the test module, and test program A acquires the updated shared information of test item A1. Similarly, test program A can acquire the updated shared information of test item A2 and the updated shared information of test item A3. It is to be noted that multiple test items in test program A may also listen to each other. For example, when test item A1 listens to test items A2 and A3, the identifier of the shared information may be the identifier of the shared test resource occupation information. In this manner, the parallel test of multiple test items can be achieved, that is, multiple devices under test can be tested simultaneously, so the utilization of test resources is improved, and testing costs are saved.

In an example, a handler control program may replace the tested device under test in time according to the test result of the test program. If the program for testing the device under test is test program A, and the handler control program is program B, program A and program B are registered in the session table of the session management module. Program B listens to program A. When the identifier of the shared information of program A is the identifier of the shared test result data information and when the test result data information of program A is tested, the shared information of program A is changed. Program A notifies the session management module, and the session management module broadcasts information to all programs that listen to program A, that is, notifies handler control program B. If program B determines according to the traffic operation rule of program B that it is necessary to call the public function of the shared information in the session management module to acquire the updated shared information, test program A is the test module, program B is the listening module, and program B needs to acquire the updated shared information of test program A, so a replacement instruction is generated according to the updated shared information, and the tested device under test can be replaced in time.

In an example, when a production monitoring program monitors the entire test process, something abnormal can be detected in time and intervened. When the program for testing the device under test is test program A and the production monitoring program is program C, program C is registered in the session table of the session management module and listens to test program A. The shared information identifier of test program A may be the identifier of the shared test anomaly information, which can be understood as that the test result of test program A is abnormal information of fail. When the test result of test program A is test anomaly information, the shared information is changed, test program A notifies the session management module, and the session management module broadcasts information to all registered programs that listen to program A, that is, notifies production monitoring program C. If production monitoring program C determines according to the traffic operation rule of production monitoring program C that it is necessary to call the public function of the shared information in the session management module to acquire the updated shared information, at this time, test program A is the test module, program C is the listening module, and program C needs to acquire the updated shared information of test program A, so corresponding intervention measures can be taken in time for the test anomaly information of test program A, such as issuing an alarm or stopping the running of test program A, for probe cleaning processing.

In an example, a third-party data analysis program analyzes the test result of the test program to optimize the test plan and achieve the adaptive test. When the third-party data analysis program is program D and the program for testing the device under test is program A, program D is registered in the session table of the session management module and listens to test program A. The shared information identifier of test program A may be the identifier of the shared test result data information or an identifier of shared test result data amount information. When the amount of test result data of program A exceeds a predefined threshold, that is, when the shared information of program A is changed, program A notifies the session management module, and the session management module broadcasts information to all registered programs that listen to A, that is, notifies third-party data analysis program D. If third-party data analysis program D determines according to the traffic operation rule of third-party data analysis program D that it is necessary to call the public function of the shared information in the session management module to acquire the updated shared information, at this time, test program A is the test module, program D is the listening module, and program D needs to acquire the updated shared information of test program A, so the test process is intervened and the test result is analyzed in time according to the amount of the test result data of program A, thus the current test plan is optimized and adjusted, and the adaptive test is achieved.

In an example, when a device maintenance and self-check program is program E and the program for testing the device under test is test program A, program E is registered in the session table in the session management module and listens to test program A, and the shared information identifier of test program A may be at least one of the identifiers of the shared test anomaly information, the identifier of the shared test time information and the identifier of the shared test state information. When the test of test program A is abnormal, or the test time reaches a predefined time threshold, or the test state is an idle state, the shared information is changed, program A notifies the session management module, and the session management module broadcasts information to all registered programs that listen to program A, that is, notifies device maintenance and self-check program E. Device maintenance and self-check program E can implement the device maintenance and self-check program using the same principle as above to ensure that the accuracy of the test result reaches a predefined threshold. Similarly, in another example, yield analysis program F is registered in the session table in the session management module and listens to test program A. The shared information identifier of test program A may be the identifier of the shared test result data information, so yield analysis program F can perform yield analysis and divide test results into valid results and invalid results. The listening process is not repeated. In another example, fault detection program F is registered in the session table of the session management module and listens to test program A. The shared information identifier of test program A may be at least one of the identifiers of the shared device temperature information, the identifier of the shared device environment information and the identifier of the shared fault detection result information. If the device temperature of test program A is abnormal, or the device environment information of test program A is abnormal, or the fault detection result information of test program A is abnormal, that is, when the shared information of program A is changed, fault detection program F determines according to the traffic operation rule of fault detection program F that it is necessary to call the public function of the shared information in the session management module to acquire the updated shared information, and then fault detection program F acquires the updated shared information of test program A for fault detection. The process is not repeated.

The preceding programs require varying degrees of data communication and cross operations with each other. Through the session management module in the present application, collaborative work can be better achieved, and information sharing among multiple programs can be achieved.

According to the technical solutions, a demand instruction sent by a session management module is received, where the demand instruction carries identifier information corresponding to a target test module and a shared information identifier corresponding to the target test module; if a traffic operation rule satisfies a first condition, an acquisition instruction is generated according to the identifier information corresponding to the target test module and the shared information identifier corresponding to the target test module; the acquisition instruction is sent to the session management module so that the session management module sends, after receiving the acquisition instruction, the acquisition instruction to the target test module; shared information corresponding to the shared information identifier sent by the target test module through the session management module is received. In this manner, the problem is solved that frequent acquisition of shared information of other modules during the running of multiple modules leads to inefficient completion of work and low data transmission efficiency, so the running efficiency of multiple modules can be improved and efficient collaborative work among multiple modules can be ensured.

Embodiment Three

Figures 5, 6:
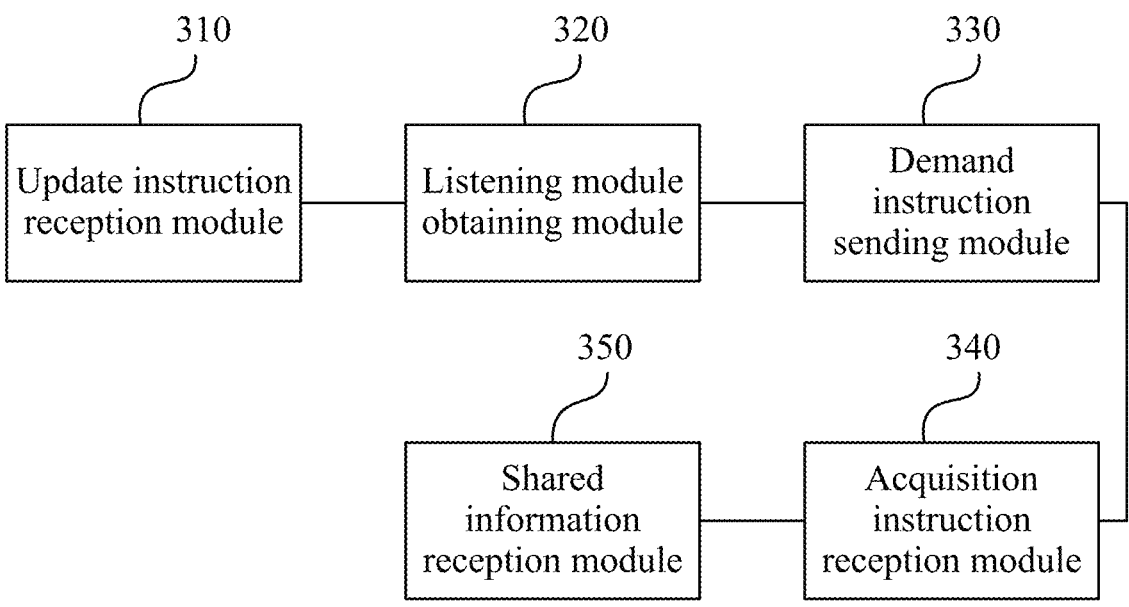
FIG. 5 is a structural diagram of a management apparatus according to Embodiment Three of the present application.
FIG. 6 is a structural diagram of a management apparatus according to Embodiment Four of the present application.

FIG. 5 is a structural diagram of a management apparatus according to embodiment three of the present application. The embodiment is applicable to the case of multi-module communication management, such as information sharing and multi-test progress collaboration in the communication process. The apparatus may be implemented by software and/or hardware and may be integrated in any device that provides management functions. As shown in FIG. 5, the management apparatus includes an update instruction reception module 310, a listening module obtaining module 320, a demand instruction sending module 330, an acquisition instruction reception module 340 and a shared information reception module 350.

The update instruction reception module 310 is configured to receive an update instruction sent by a target test module, where the update instruction carries identifier information corresponding to the target test module and a shared information identifier corresponding to the target test module, and the target test module is a test module sharing updated shared information when the shared information is updated.

The listening module obtaining module 320 is configured to query a session table according to the identifier information corresponding to the target test module to obtain a listening module identifier set corresponding to the target test module, where the session table is stored in the session management module.

The demand instruction sending module 330 is configured to send a demand instruction to a listening module corresponding to each listening module identifier in the listening module identifier set, where the demand instruction carries the identifier information corresponding to the target test module and the shared information identifier corresponding to the target test module.

The acquisition instruction reception module 340 is configured to receive an acquisition instruction sent by a listening module and send the acquisition instruction to the target test module so that the target test module sends shared information corresponding to the shared information identifier to the session management module, where the acquisition instruction carries the identifier information corresponding to the target test module and the shared information identifier corresponding to the target test module.

The shared information reception module 350 is configured to receive the shared information corresponding to the shared information identifier sent by the target test module, and send the shared information corresponding to the shared information identifier to the listening module.

Optionally, the management apparatus further includes a session table acquisition module, and the session table acquisition module is configured to acquire the session table. The session table includes identifier information corresponding to the at least one test module, state information corresponding to the at least one test module, attribute information corresponding to each test module identifier and a public function corresponding to each piece of shared information, where the attribute information includes at least one listening module identifier and at least one shared information identifier which correspond to each test module identifier.

Optionally, the session table acquisition module is configured to receive a registration instruction sent by the at least one test module or the at least one listening module, and perform, according to the registration instruction, registration in the session table based on registration information corresponding to the at least one test module or the at least one listening module to update the session table, where the registration instruction carries the registration information, and the registration information of a test module of the at least one test module includes identifier information, state information, attribute information and a public function corresponding to each piece of shared information, where the attribute information of the test module includes at least one shared information identifier corresponding to the test module; the registration information of a listening module of the at least one listening module includes identifier information, state information and attribute information, where the attribute information of the listening module includes at least one shared information identifier of a test module to which the listening module wants to listen and corresponding to the listening module.

Optionally, the session table acquisition module is configured to receive an information modification instruction sent by the at least one test module or the at least one listening module, and perform, according to the information modification instruction, modification in the session table based on modification information corresponding to the at least one test module or the at least one listening module to update the session table, where the information modification instruction carries the modification information, and the modification information includes at least one of state information, attribute information and a public function.

Optionally, the management apparatus further includes a state information update module. The state information update module is configured to, if not receiving the acquisition instruction sent by the listening module, update state information corresponding to the listening module in the session table according to identifier information corresponding to the listening module; and/or if not receiving successful-calling information of the listening module within a predefined time, update, according to a public function corresponding to the target test module, at least one of state information corresponding to the target test module in the session table, a shared information identifier corresponding to the public function in attribute information in the session table and the public function, where the successful-calling information indicates that the listening module successfully establishes a connection with the target test module by calling the corresponding public function through the session management module; and/or if not receiving the shared information corresponding to the shared information identifier sent by the target test module within a predefined time, update state information corresponding to the target test module in the session table according to the identifier information corresponding to the target test module.

The preceding product can perform the method provided by any embodiment of the present application and has function modules corresponding to the method performed.

Embodiment Four

FIG. 6 is a structural diagram of a management apparatus according to embodiment four of the present application. The embodiment is applicable to the case of multi-module communication management, such as information sharing and progress collaboration in the multi-module communication process. The apparatus may be implemented by software and/or hardware and may be integrated in any device that provides management functions. As shown in FIG. 6, the management apparatus includes a demand instruction reception module 410, an acquisition instruction generation module 420, an acquisition instruction sending module 430 and a shared information sending module 440.

The demand instruction reception module 410 is configured to receive a demand instruction sent by a session management module, where the demand instruction carries identifier information corresponding to a target test module and a shared information identifier corresponding to the target test module.

The acquisition instruction generation module 420 is configured to, if a traffic operation rule satisfies a first condition, generate an acquisition instruction according to the identifier information corresponding to the target test module and the shared information identifier corresponding to the target test module.

The acquisition instruction sending module 430 is configured to send the acquisition instruction to the session management module so that the session management module sends, after receiving the acquisition instruction, the acquisition instruction to the target test module.

The shared information sending module 440 is configured to receive shared information corresponding to the shared information identifier sent by the target test module through the session management module.

Optionally, the acquisition instruction generation module is configured to, if a test sequence within a predefined range of a current test sequence corresponding to the listening module includes a feedback flag, acquire a first target test sequence corresponding to a target waited result corresponding to the feedback flag; if the first target test sequence is a test sequence of the target test module, determine that the traffic operation rule of the listening module satisfies the first condition; and generate the acquisition instruction according to the identifier information corresponding to the target test module and the shared information identifier corresponding to the target test module.

Optionally, the acquisition instruction generation module is configured to, if a test sequence within a predefined range of a current test sequence corresponding to the listening module includes a comparison flag, acquire a second target test sequence corresponding to at least one piece of comparison information corresponding to the comparison flag; if the second target test sequence is a test sequence of the target test module, determine that the traffic operation rule of the listening module satisfies the first condition; and generate the acquisition instruction according to the identifier information corresponding to the target test module and the shared information identifier corresponding to the target test module.

Optionally, the shared information identifier includes at least one of an identifier of shared test ending information, an identifier of shared test resource occupation information, an identifier of shared handler control information, an identifier of shared test result data information, an identifier of shared test anomaly information, an identifier of shared test state information, an identifier of shared test time information, an identifier of shared device temperature information, an identifier of shared device environment information and an identifier of shared fault detection result information.

The preceding product can perform the method provided by any embodiment of the present application and has function modules corresponding to the method performed.

Embodiment Five

Figure 7:
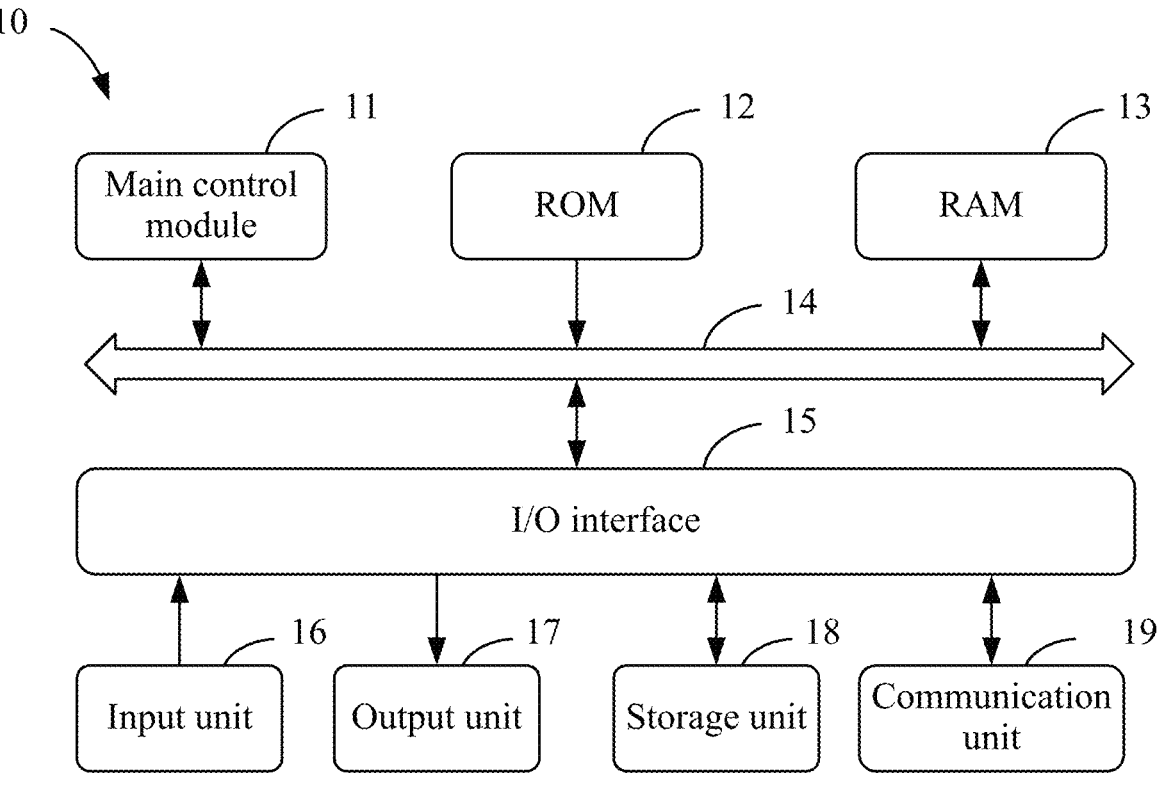
FIG. 7 is a structural diagram of an automatic test equipment (ATE) test system according to Embodiment Five of the present application.

FIG. 7 is a structural diagram of an ATE test system according to embodiment five of the present application. The ATE test system includes an ATE tester and/or a tester auxiliary device. The tester includes a test head and an industrial control computer. The tester auxiliary device may be a handler or a third-party data analysis instrument. Herein the shown components, the connections and relationships between these components, and the functions of these components are illustrative only and are not intended to limit the implementation of the present application as described and/or claimed herein.

As shown in FIG. 7, the ATE test system 10 includes at least one main control module 11 in the ATE tester and/or tester auxiliary device and a memory communicatively connected to the at least one main control module 11 in the ATE tester and/or tester auxiliary device, such as a read-only memory (ROM) 12 or a random-access memory (RAM) 13.

The memory stores a computer program that may be executed by at least one processor, and the main control module 11 in the ATE tester and/or tester auxiliary device may perform multiple appropriate actions and processing according to a computer program stored in the ROM 12 or a computer program loaded into the RAM 13 from a storage unit 18. The RAM 13 may also store various programs and data required for the operation of the ATE test system 10. The main control module 11 in the ATE tester and/or tester auxiliary device, the ROM 12 and the RAM 13 are connected to each other through a bus 14. An input/output (I/O) interface 15 is also connected to the bus 14.

Multiple components in the ATE test system 10 are connected to the I/O interface 15. The multiple components include an input unit 16 such as a keyboard and a mouse, an output unit 17 such as various types of displays and speakers, the storage unit 18 such as a magnetic disk and an optical disc and a communication unit 19 such as a network card, a modem and a wireless communication transceiver. The communication unit 19 allows the ATE test system 10 to exchange information/data with other devices over a computer network such as the Internet and/or various telecommunications networks.

The main control module 11 in the ATE tester and/or tester auxiliary device may be various general-purpose and/or special-purpose processing components having processing and computing capabilities. Some examples of the main control module 11 in the ATE tester and/or tester auxiliary device include, but are not limited to, a central processing unit (CPU), a graphics processing unit (GPU), a special-purpose artificial intelligence (AI) computing chip, a processor executing machine learning models and algorithms, a digital signal processor (DSP), and any appropriate processor, controller and microcontroller. The main control module 11 in the ATE tester and/or tester auxiliary device performs multiple methods and processing described above, such as the management method.

In some examples, the management method may be implemented as computer programs tangibly contained in a computer-readable storage medium such as the storage unit 18. In some embodiments, part or all of the computer programs may be loaded and/or installed on the ATE test system 10 via the ROM 12 and/or the communication unit 19. When the computer programs are loaded to the RAM 13 and executed by the main control module 11 in the ATE tester and/or tester auxiliary device, one or more steps of the preceding management method may be performed. Optionally, in other embodiments, the main control module 11 in the ATE tester and/or tester auxiliary device may be configured, in any other suitable manner (for example, by means of firmware), to perform the management method.

The various embodiments of the systems and techniques described herein may be implemented in digital electronic circuitry, integrated circuitry, a field-programmable gate array (FPGA), an application-specific integrated circuit (ASIC), application specific standard parts (ASSP), a system on a chip (SoC), a complex programmable logic device (CPLD), computer hardware, firmware, software and/or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting data and instructions to the memory system, the at least one input apparatus and the at least one output apparatus.

Computer programs for implementation of the methods of the present application may be written in one programming language or any combination of multiple programming languages. The computer programs may be provided for a processor of a general-purpose computer, a special-purpose computer or another programmable data processing apparatus to enable functions/operations specified in a flowchart and/or a block diagram to be implemented when the computer programs are executed by the processor. The computer programs may be executed entirely on a machine, partly on a machine, as a stand-alone software package partly on a machine and partly on a remote machine, or entirely on a remote machine or a server.

In the context of the present application, the computer-readable storage medium may be a tangible medium that may include or store a computer program for use by or in connection with an instruction execution system, apparatus or device. The computer-readable storage medium may include, but is not limited to, an electronic, magnetic, optical, electromagnetic, infrared or semiconductor system, apparatus or device or any appropriate combination thereof. Alternatively, the computer-readable storage medium may be a machine-readable signal medium. Examples of the machine-readable storage medium may include an electrical connection based on one or more wires, a portable computer disk, a hard disk, an RAM, an ROM, an erasable programmable read-only memory (EPROM), a flash memory, an optical fiber, a portable compact disc read-only memory (CD-ROM), an optical memory device, a magnetic memory device or any suitable combination thereof.

In order that interaction with a user is provided, the systems and techniques described herein may be implemented on an electronic device. The electronic device has a display apparatus (for example, a cathode-ray tube (CRT) or a liquid-crystal display (LCD) monitor) for displaying information to the user; and a keyboard and a pointing apparatus (for example, a mouse or a trackball) through which the user can provide input for the electronic device. Other types of apparatuses may also be used for providing interaction with a user. For example, feedback provided for the user may be sensory feedback in any form (for example, visual feedback, auditory feedback or tactile feedback); and input from the user may be received in any form (including acoustic input, voice input or tactile input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with embodiments of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in conventional physical host and virtual private server (VPS) services.

It is to be understood that various forms of the preceding flows may be used with steps reordered, added, or removed. For example, the steps described in the present application may be executed in parallel, in sequence or in a different order as long as the desired results of the technical solutions in the present application are achieved. The execution sequence of these steps is not limited herein.

What is claimed is:

1. A multi-module communication management method in an automatic test equipment (ATE) test system, wherein the ATE test system comprises an ATE tester and a tester auxiliary device, wherein the ATE tester comprises: a test head and an industrial control computer, and the tester auxiliary device comprises a handler; the ATE test system is configured to operate a session management module, at least one test module, and at least one listening module; the method is performed by the session management module, wherein the session management module is separately connected to the at least one test module and the at least one listening module, and the method comprises:

receiving an update instruction sent by a target test module, wherein the update instruction carries identifier information corresponding to the target test module and a shared information identifier corresponding to the target test module, and the target test module is a test module sharing updated shared information when the shared information is updated;

querying a session table according to the identifier information corresponding to the target test module to obtain a listening module identifier set corresponding to the target test module, wherein the session table is stored in the session management module;

sending a demand instruction to a listening module corresponding to each listening module identifier in the listening module identifier set, wherein the demand instruction carries the identifier information corresponding to the target test module and the shared information identifier corresponding to the target test module;

receiving an acquisition instruction sent by the listening module and sending the acquisition instruction to the target test module so that the target test module sends shared information corresponding to the shared information identifier to the session management module, wherein the acquisition instruction carries the identifier information corresponding to the target test module and the shared information identifier corresponding to the target test module; and receiving, through the test head, the shared information corresponding to the shared information identifier sent by the target test module, and sending the shared information corresponding to the shared information identifier to the listening module so that the listening module generates a replacement instruction according to the updated shared information and controls the handler to replace a tested device under test.

2. The method according to claim 1, characterized in that before receiving the update instruction sent by the target test module, the method further comprises:

acquiring the session table, wherein the session table comprises: identifier information corresponding to the at least one test module, state information corresponding to the at least one test module, attribute information corresponding to each test module identifier and a public function corresponding to each piece of shared information, wherein the attribute information comprises: at least one listening module identifier and at least one shared information identifier which correspond to the each test module identifier.

3. The method according to claim 2, characterized in that acquiring the session table comprises:

receiving a registration instruction sent by the at least one test module or the at least one listening module; and performing, according to the registration instruction, registration in the session table based on registration information corresponding to the at least one test module or the at least one listening module to update the session table;

wherein the registration instruction carries the registration information;

the registration information corresponding to a test module of the at least one test module comprises identifier information, state information, attribute information and a public function corresponding to each piece of shared information, and the attribute information of the test module comprises at least one shared information identifier corresponding to the test module; and the registration information corresponding to a listening module of the at least one listening module comprises identifier information, state information and attribute information, and the attribute information of the listening module comprises at least one shared information identifier of a test module to which the listening module wants to listen and corresponding to the listening module.

4. The method according to claim 3, characterized in that acquiring the session table comprises:

receiving an information modification instruction sent by the at least one test module or the at least one listening module, and performing, according to the information modification instruction, modification in the session table based on modification information corresponding to the at least one test module or the at least one listening module to update the session table;

wherein the information modification instruction carries the modification information, and the modification information comprises at least one of state information, attribute information and a public function.

5. The method according to claim 2, characterized by further comprising:

if the acquisition instruction sent by the listening module is not received, updating state information corresponding to the listening module in the session table according to identifier information corresponding to the listening module; and/or if successful-calling information of the listening module is not received within a predefined time, updating, according to a public function corresponding to the target test module, at least one of state information corresponding to the target test module in the session table, a shared information identifier corresponding to the corresponding public function in attribute information in the session table and the corresponding public function; wherein the successful-calling information indicates that the listening module successfully establishes a connection with the target test module by calling the corresponding public function through the session management module; and/or if the shared information corresponding to the shared information identifier sent by the target test module is not received within a predefined time, updating state information corresponding to the target test module in the session table according to the identifier information corresponding to the target test module.

6. A multi-module communication management method in an automatic test equipment (ATE) test system, characterized in that the ATE test system comprises an ATE tester and a tester auxiliary device, wherein the ATE tester comprises: a test head and an industrial control computer, and the tester auxiliary device comprises a handler; the ATE test system is configured to operate a session management module, at least one test module, and at least one listening module; the method is performed by a listening module of the at least one listening module, and the method comprises:

receiving a demand instruction sent by the session management module, wherein the demand instruction carries identifier information corresponding to a target test module and a shared information identifier corresponding to the target test module;

if the traffic operation rule satisfies a first condition, generating an acquisition instruction according to the identifier information corresponding to the target test module and the shared information identifier corresponding to the target test module;

sending the acquisition instruction to the session management module so that the session management module sends, after receiving the acquisition instruction, the acquisition instruction to the target test module; and receiving, through the test head, shared information corresponding to the shared information identifier sent by the target test module through the session management module to generate a replacement instruction according to the shared information and control the handler to replace a tested device under test.

7. The method according to claim 6, characterized in that if the traffic operation rule satisfies the first condition, generating the acquisition instruction according to the identifier information corresponding to the target test module and the shared information identifier corresponding to the target test module comprises:

if a test sequence within a predefined range of a current test sequence corresponding to the listening module comprises a feedback flag, acquiring a first target test sequence corresponding to a target waited result corresponding to the feedback flag;

if the first target test sequence is a test sequence of the target test module, determining that the traffic operation rule of the listening module satisfies the first condition; and generating the acquisition instruction according to the identifier information corresponding to the target test module and the shared information identifier corresponding to the target test module.

8. The method according to claim 6, characterized in that if the traffic operation rule satisfies the first condition, generating the acquisition instruction according to the identifier information corresponding to the target test module and the shared information identifier corresponding to the target test module comprises:

if a test sequence within a predefined range of a current test sequence corresponding to the listening module comprises a comparison flag, acquiring a second target test sequence corresponding to at least one piece of comparison information corresponding to the comparison flag;

if the second target test sequence is a test sequence of the target test module, determining that a traffic operation rule of the listening module satisfies the first condition; and generating the acquisition instruction according to the identifier information corresponding to the target test module and the shared information identifier corresponding to the target test module.

9. The method according to claim 6, characterized in that the shared information identifier comprises at least one of: an identifier of shared test ending information, an identifier of shared test resource occupation information, an identifier of shared handler control information, an identifier of shared test result data information, an identifier of shared test anomaly information, an identifier of a shared test state information, an identifier of shared test time information, an identifier of shared device temperature information, an identifier of shared device environment information and an identifier of shared fault detection result information.

10. An automatic test equipment (ATE) test system, characterized by comprising an ATE tester and a tester auxiliary device;

wherein the ATE tester runs at least one executable computer program to implement the management method according to claim 1.

11. An automatic test equipment (ATE) test system, characterized by comprising an ATE tester and a tester auxiliary device;

wherein the tester auxiliary device runs at least one executable computer program to implement the management method according to claim 6.

* * * * *